US012786088B2

(12) United States Patent
Fioccola et al.

(10) Patent No.: US 12,786,088 B2
(45) Date of Patent: Nov. 3, 2026

(54) DEVICE, ON-PATH OBSERVER ENTITY, AND METHODS FOR COMMUNICATION NETWORKS

(71) Applicant: HUAWEI TECHNOLOGIES CO., LTD., Shenzhen (CN)

(72) Inventors: Giuseppe Fioccola, Segrate (IT); Tianran Zhou, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 248 days.

(21) Appl. No.: 18/638,308

(22) Filed: Apr. 17, 2024

(65) Prior Publication Data

US 2024/0267313 A1 Aug. 8, 2024

Related U.S. Application Data

(63) Continuation of application No. PCT/CN2021/125074, filed on Oct. 20, 2021.

(51) Int. Cl.
*H04L 43/0864* (2022.01)
*H04L 43/0829* (2022.01)

(52) U.S. Cl.
CPC ...... *H04L 43/0864* (2013.01); *H04L 43/0829* (2013.01)

(58) Field of Classification Search
CPC ............. H04L 43/0864; H04L 43/0829; H04L 43/0852; H04L 43/0835
USPC .......................................................... 270/252
See application file for complete search history.

(56) References Cited

U.S. PATENT DOCUMENTS

2012/0151028 A1* 6/2012 Lu ........................... H04L 69/22 709/223
2015/0281241 A1* 10/2015 Sharma ................... H04L 9/083 726/9
2020/0322166 A1* 10/2020 Park ...................... H04L 9/3263
2021/0126741 A1* 4/2021 Cao ......................... H04L 1/188

OTHER PUBLICATIONS

Cociglio et al., "Explicit Flow Measurements Techniques draftmdt-ippm-explicit-flow-measurements-01," Internet-Draft, IPPM, Internet Engineering Task Force, IETF, XP015144720, Total 39 pages (Feb. 2021).

(Continued)

*Primary Examiner* — Mang Hang Yeung
(74) *Attorney, Agent, or Firm* — Leydig, Voit & Mayer, Ltd.

(57) ABSTRACT

A device is disclosed for operating according to a client-server communication protocol in a communication network. The device is configured to send to or receive from another device in the communication network, a message comprising a header. The header includes an option value that includes a first Performance Measurement (PM) bit. The first PM bit indicates a first performance parameter and a second performance parameter. Further, an on-path observer entity is disclosed for a constrained application (CoAP) protocol. The on-path observer entity is configured to receive a CoAP message including a header from a device. The header includes an option value that includes a first PM bit. The first PM bit indicates a first performance parameter and a second performance parameter.

20 Claims, 6 Drawing Sheets

(56) References Cited

OTHER PUBLICATIONS

Mizrahi et al., "AM-PM: Efficient Network Telemetry using Alternate Marking," IEEE Network, IEEE Service Center, New York, NY, US, vol. 33, No. 4, XP011737526, Total 7 pages (Jul. 2019).
Shelby et al., "The Constrained Application Protocol (CoAP)," Internet Engineering Task Force (IETF), Request for Comments: 7252, total 112 pages (Jun. 2014).
Bormann et al., "Block-Wise Transfers in the Constrained Application Protocol (CoAP)," Internet Engineering Task Force (IETF), Request for Comments: 7959, Updates: 7252, total 37 pages (Aug. 2016).
Bormann et al., "CoAP (Constrained Application Protocol) over TCP, TLS, and WebSockets," Internet Engineering Task Force (IETF), Request for Comments: 8323, Updates: 7641, 7959, total 54 pages (Feb. 2018).
Fioccola et al., "Alternate-Marking Method for Passive and Hybrid Performance Monitoring," Internet Engineering Task Force (IETF), Request for Comments: 8321, total 33 pages (Jan. 2018).
Iyengar et al., "RFC 9000: QUIC: A UDP-Based Multiplexed and Secure Transport," Internet Engineering Task Force (IETF), total 127 pages (May 2021).
Cociglio et al., "Explicit Flow Measurements Techniques draft-mdt-ippm-explicit-flow-measurements-02," total 33 pages (Jul. 12, 2021).
Bradner et al., "Intellectual Property Rights in IETF Technology," Internet Engineering Task Force (IETF), Request for Comments: 8179, total 22 pages (May 2017).

* cited by examiner

DEVICE, ON-PATH OBSERVER ENTITY, AND METHODS FOR COMMUNICATION NETWORKS

CROSS-REFERENCE TO RELATED APPLICATIONS

This application is a continuation of International Application No. PCT/CN2021/125074, filed on Oct. 20, 2021, the disclosure of which is hereby incorporated by reference in its entirety.

TECHNICAL FIELD

The present disclosure relates generally to the field of communication networks. Specifically, the present disclosure relates to a device and a method for operating according to a client-server communication protocol in the communication network. The communication protocol may be a Constrained Application protocol (CoAP). The present disclosure also relates to an on-path observer entity and a method for a CoAP communication.

BACKGROUND

Generally, a CoAP is a specialized webtransfer communication protocol for use with constrained nodes and constrained (e.g., low-power, lossy) networks. A reliability of a transmitted message in the CoAP is provided by marking a message as confirmable (CON) with ACKs. A message that does not require a reliable transmission may be sent as a non-confirmable message (NON).

A conventional CoAP protocol is based on a reliable mode CoAP. In the reliable mode of the CoAP, there may be sequence numbers and ACKs, which could eventually be used to measure a Round-Trip Time (RTT) and losses. However, the reliable mode of the CoAP may be resource-consuming for constrained nodes, since the constrained nodes have to look at sequence numbers, and have to obtain timestamps. Performing such operations is resource consuming and therefore expensive. Another conventional CoAP protocol is based on an unreliable mode CoAP. In the unreliable mode of the CoAP, there may be no ACK, and consequently, there may be no possibility to measure the RTT and losses.

One proposed method for measuring loss and delay in the CoAP is based on an Explicit Flow Measurement (EFM) technique. The EFM based method employs a few marking bits, arranged inside the header of each packet, for performing loss and delay measurements. The EFM based method may be used for encrypted protocols, in which there are only a few bits available in the non-encrypted header to allow performance metrics from an on-path observer.

An issue of conventional devices and methods is that substantially complex algorithms are used, which may not be applicable in the CoAP environment.

SUMMARY

In view of the above, the present disclosure aims to improve the conventional devices and methods for operating in a communication network, based on a communication protocol such as CoAP.

The present disclosure can provide a performance measurement method that is simple and straightforward to carry out. For example, the performance measurement method of the present disclosure can operate with limited resources on constrained nodes in the CoAP.

The present disclosure can also provide constrained application performance metrics. For example, the devices and methods of the present disclosure can facilitate performance measurements for CoAP, e.g., for machine-to-machine (M2M) applications such as Internet of Things (IoT), smart energy, building automation, etc.

The present disclosure can also exploit synergies between different Performance Measurement (PM) bits, in order to improve the performance measurements. For instance, the disclosure aims at exploiting a synergy between Spin (S) bit and sQuare (Q) bit.

A first aspect of the present disclosure provides a device for operating according to a client-server communication protocol in a communication network, the device being configured to send to or receive from another device in the communication network, a message comprising a header, the header comprising an option that includes a first (PM) bit, wherein the first PM bit indicates a first performance parameter and a second performance parameter.

The device may be, or may be implemented in, a client device, a server device, a node, a constrained node, etc. For example, the device may be a constrained node configured to communicate based on CoAP. The constrained node may have limited power, memory, complexity, or the like, without limiting the present disclosure to the CoAP or the nodes in the CoAP. The device may comprise a circuitry. The circuitry may comprise hardware and software. The hardware may comprise analog or digital circuitry, or both analog and digital circuitry. The circuitry may comprise one or more processors and a non-volatile memory connected to the one or more processors. The non-volatile memory may carry executable program code which, when executed by the one or more processors, causes the device to perform the operations or methods described herein.

The device of the first aspect may operate in the CoAP and may use one or more options. In at least one option, it may be possible to encode PM bits. The PM bits may be, for example, an S bit, a Q bit, and one or more event signaling bits. The device may (e.g., the client or the server) set the one or more bits.

The device of the first aspect may support measuring performance metrics in a CoAP environment to satisfy the low resources of constrained nodes.

For example, the device may send the message to the other device, or the device may receive the message from the other device. The message in this case comprises the option. The option may specify a range of permissible numbers of bytes, for example, if it has a choice, a sender may represent the integer with as few bytes. For example, the number 0 may be represented with an empty option value (a zero-length sequence of bytes) and the number 1 may be represented by a single byte with the numerical value of 1. Furthermore, the device and/or the other device may process the values in the options, e.g., the 0 or the 1.

In an implementation form of the first aspect, the first PM bit is a Q bit.

For example, the Q bit may indicate a square wave. Every outgoing packet may comprise the Q bit value, which may be initialized to 0 and may be inverted after sending a number of packets (a sQuare Block or simply Q Block). Further, the device may estimate losses by watching a single direction of the traffic flow, and counting the number of packets in each observed Q Block.

For example, the used operations for processing the S bit and the Q bit may be lighter than a conventional measurement, which is based on reading sequence numbers for each packet and by taking timestamps for each packet. Further, the S bit and Q bit may be applied for a batch of packets in such a way that the S bit may be used for measuring RTT and one-way delay, and the Q bit may be used for measuring one-way packet loss. Furthermore, it may be possible to choose the node with less constraints.

This may enable equipping the CoAP with performance measurement bits to enable RTT and loss measurements. Hence, it may be possible to provide a simple way to perform performance measurements in a constrained node.

In a further implementation form of the first aspect, the device is further configured to set a value of the first PM bit for the message based on a predefined criterion, for instance, based on a fixed number of data packets of the message.

In a further implementation form of the first aspect, the first performance parameter is a one way packet loss, and wherein the device is further configured to determine the one way packet loss for the message based on the first PM bit.

In a further implementation form of the first aspect, the second performance parameter is a RTT, and wherein the device is further configured to flip the value of the first PM bit of a single packet to an opposite of the value, once per each RTT.

In a further implementation form of the first aspect, the device is further configured to determine a signal to retrieve the estimated RTT for the message based on the first PM bit.

For example, the device may estimate the RTT. This may further enable determining network issues in the communication network. For instance, the signaling of loss and RTT events may be used to signal the network issues to an on-path observer (e.g., network administrator, proxy, and gateway) in the communication network.

In a further implementation form of the first aspect, the option further includes at least one of:

a second PM bit, and/or one or more event bits.

In a further implementation form of the first aspect, the second PM is an S bit.

The S bit may be a single bit signal that toggles once per RTT. Further, the S bit may enable latency monitoring of a connection-oriented communication from intermediate observation points.

For example, the device may be client device or server device. The device may also set the value of the Q bit in both uplink and downlink, in order to measure both directions.

In a further implementation form of the first aspect, the second PM bit has a value of 0 or 1, and the device is further configured to change the value of the second PM bit from 0 to 1 or from 1 to 0, once per each end-to-end RTT.

For example, the device and the other device (e.g., the client and the server) may maintain an internal per-connection spin value (i.e., 0 or 1) used to set the spin bit on outgoing packets. The device and/or the other device may initialize the spin value to 0 when a new connection starts.

In the case of the RTT, the device may be only the client. Further, the other device (i.e., the server device) may reflect based on the same rule, when it sees a flipped value in the S bit.

In a further implementation form of the first aspect, the one or more event bits are configured to encode at least one of loss information and delay information.

In a further implementation form of the first aspect, determine the one way delay for the one or more event bits, and/or determine the one way packet loss for the message based on the one or more event bits. For example, the device may measure packet loss occurred in any single block between any two points.

Furthermore, the device may support adjusting the timeout values based on the real network performance In a further implementation form of the first aspect, the communication network is based on a machine-to-machine (M2M) network performing a CoAP communication as the client-server communication protocol, and/or the device is a server or a client and is configured to perform a CoAP communication, and/or the message is a CoAP message.

In a further implementation form of the first aspect, the device is further configured to provide the CoAP message to an on-path observer entity of the CoAP communication.

In a further implementation form of the first aspect, the device is further configured to receive a notification from the on-path observer entity, and adjust a protocol parameter of the CoAP communication based on the first A second aspect of the disclosure provides an on-path observer entity for a CoAP communication, the on-path observer entity being configured to receive a CoAP message comprising a header from a device, and the header comprising an option that includes a first PM bit, wherein the first PM bit indicates a first performance parameter and a second performance parameter.

The on-path observer entity may be a gateway, or a proxy. Moreover, the on-path observer entity of the second aspect may notify the device (e.g., a client device, a server device, a node, etc.) about the first performance parameter and a second performance parameter.

In an implementation form of the second aspect, the first performance parameter is a one way packet loss and/or the second performance parameter is a RTT, and the on-path observer entity is further configured to adjust a protocol parameter of the CoAP communication based on the first performance parameter and/or based on the second performance parameter, and output a notification to the device, the notification indicating the adjusted protocol parameter of the CoAP communication.

In a further implementation form of the second aspect, the on-path observer entity is or is included in a proxy or a gateway for the CoAP communication.

A third aspect of the disclosure provides a method for operating according to a client-server communication protocol in a communication network, the method comprising sending or receiving a message comprising a header, the header comprising an option that includes a first PM bit, wherein the first PM bit indicates a first performance parameter and a second performance parameter.

In an implementation form of the third aspect, the first PM bit is a Q bit.

In a further implementation form of the third aspect, the method further comprises setting a value of the first PM bit for the message based on a predefined criterion, for instance, based on a fixed number of data packets of the message.

In a further implementation form of the third aspect, the first performance parameter is a one way packet loss, and wherein the method further comprises determining the one way packet loss for the message based on the first PM bit.

In a further implementation form of the third aspect, the second performance parameter is a RTT, and wherein the method further comprises flipping the value of the first PM bit of a single packet to an opposite of the value, once per each RTT.

In a further implementation form of the third aspect, the method further comprises determining a signal to retrieve the estimated RTT for the message based on the first PM bit.

In a further implementation form of the third aspect, the option further includes at least one of:

a second PM bit, and/or one or more event bits.

In a further implementation form of the third aspect, the second PM is an S bit.

In a further implementation form of the third aspect, the second PM bit has a value of 0 or 1, and wherein the method further comprises changing the value of the second PM bit from 0 to 1 or from 1 to 0, once per each end-to-end RTT.

In a further implementation form of the third aspect, the method further comprises encoding by the one or more event bits, at least one of loss information and delay information.

In a further implementation form of the third aspect, the method further comprises determining the one way delay for the one or more event bits, and/or determining the one way packet loss for the message based on the one or more event bits.

In a further implementation form of the third aspect, the communication network is based on a M2M network performing a CoAP communication as the client-server communication protocol, and/or the method is for a server or a client and is configured to perform a CoAP communication, and/or the message is a CoAP message.

In a further implementation form of the third aspect, the method further comprises providing the CoAP message to an on-path observer entity of the CoAP communication.

In a further implementation form of the third aspect, the method further comprises receiving a notification from the on-path observer entity, and adjusting a protocol parameter of the CoAP communication based on the first performance parameter and/or based on the second performance parameter.

The method of the third aspect achieves the advantages and effects described for the device of the first aspect.

A fourth aspect of the disclosure provides a method for an on-path observer entity for a CoAP communication, the method comprising receiving a CoAP message comprising a header from a device, and the header comprising an option that includes a first PM bit, wherein the first PM bit indicates a first performance parameter and a second performance parameter.

In an implementation form of the second aspect, the first performance parameter is a one way packet loss and/or the second performance parameter is a RTT, and the method further comprises adjusting a protocol parameter of the CoAP communication based on the first performance parameter and/or based on the second performance parameter, and outputting a notification to the device, the notification indicating the adjusted protocol parameter of the CoAP communication.

In a further implementation form of the fourth aspect, the on-path observer entity is or is included in a proxy or a gateway for the CoAP communication.

The method of the fourth aspect achieves the advantages and effects described for the on-path observer entity of the second aspect.

A fifth aspect of the present disclosure provides a computer program comprising a program code for performing the method according to the third aspect or the fourth aspect or any of their implementation forms.

A sixth aspect of the present disclosure provides a non-transitory storage medium storing executable program code which, when executed by a processor, causes the method according to the third aspect or the fourth aspect or any of their implementation forms to be performed.

The devices, elements, units and means described in the present application could be implemented in software or hardware elements or any kind of combination thereof. The steps which are performed by the various entities described in the present application, as well as the functionalities described to be performed by the various entities, are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
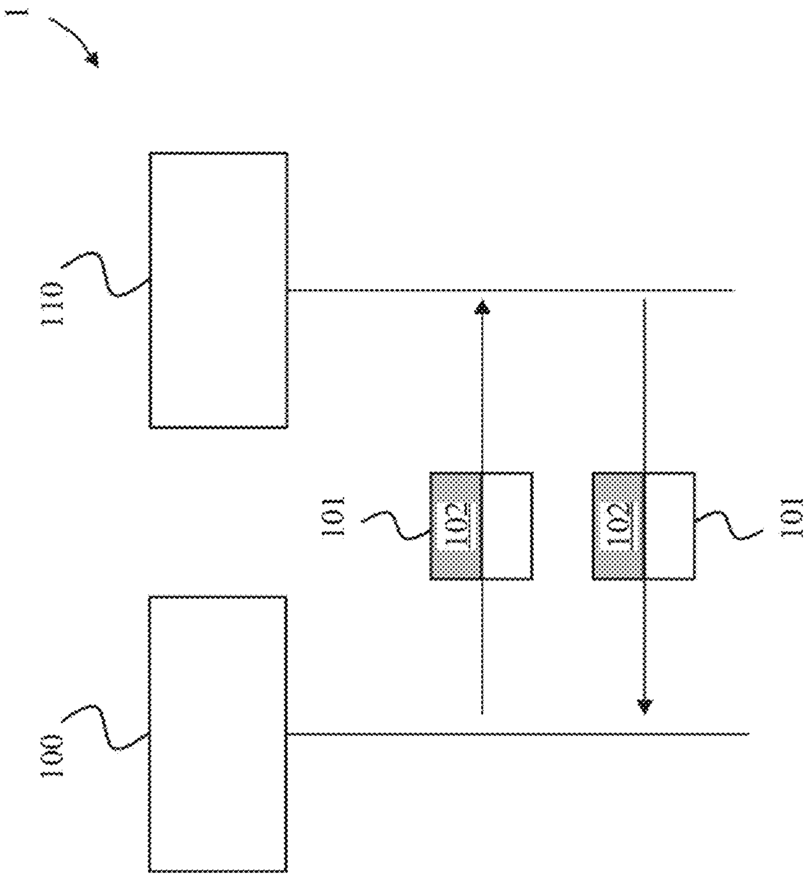
FIG. 1 depicts a schematic view of a device for operating according to a client-server communication protocol in a communication network, according to an exemplary embodiment of the disclosure.

FIG. 1 shows a schematic view of a device 100 for operating according to a client-server communication protocol in a communication network 1, according to an exemplary embodiment of the disclosure The device 100 may be a client device, a server device, a node, or the like. The communication network 1 may be based on a CoAP communication. For example, the communication 1 may operate according to a CoAP protocol.

The device 100 is configured to send to or receive from another device 110 in the communication network 1, a message 101 comprising a header 102. The header 102 comprises an option that includes a first PM bit. The first PM bit indicates a first performance parameter and a second performance parameter.

The device 100 may comprise processing circuitry configured to perform, conduct or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

Figure 2:
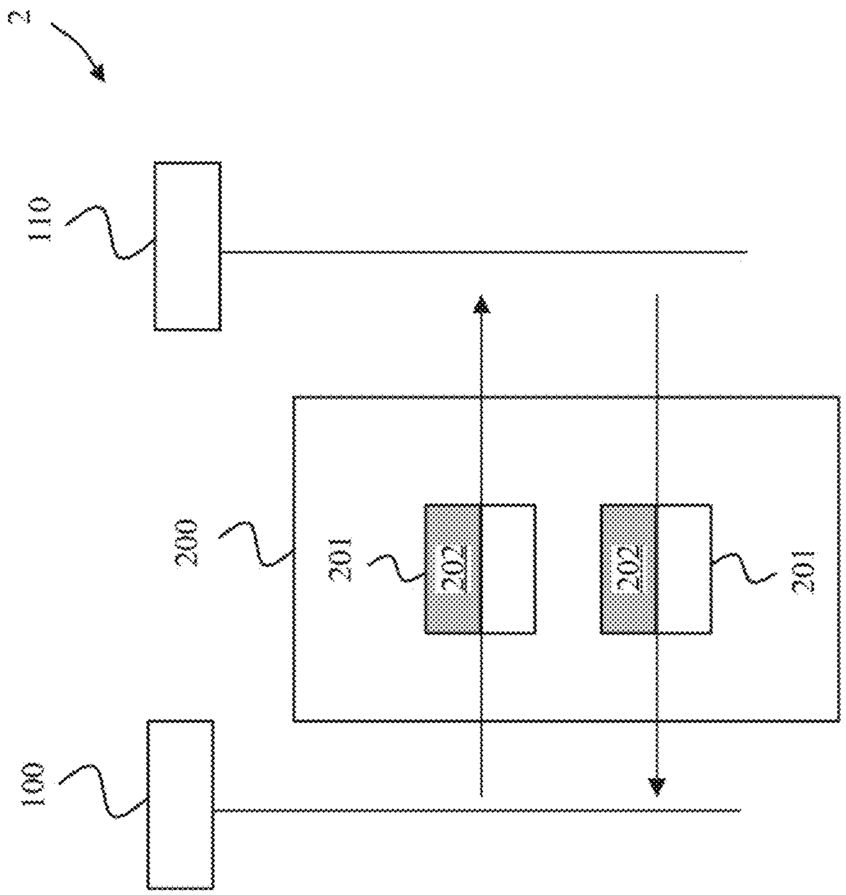
FIG. 2 depicts a schematic view of an on-path observer entity for a CoAP communication, according to an exemplary embodiment of the disclosure.

FIG. 2 depicts a schematic view of an on-path observer entity 200 for a CoAP communication 2, according to an exemplary embodiment of the disclosure.

The on-path observer entity 200 may be, for example, a gateway, a proxy, or the like. The CoAP communication 2 may be a communication performed in a communication network 1 based on a CoAP protocol.

The on-path observer entity 200 is configured to receive a CoAP message 201 comprising a header 202 from a device 100 or 110. The message 201 may be the message 101 of FIG. 1. Accordingly, the header 202 of the message 201 may be the header 102 of FIG. 1. The device 100 or 110 may be a client device or a server device. The header 202 comprises an option that includes a first PM bit. The first PM bit indicates a first performance parameter and a second performance parameter.

In some implementation forms, the on-path observer entity 200 may be implemented in a proxy for performing a CoAP.

For example, the on-path observer entity 200 may be included in a proxy or a gateway for the CoAP communication 2.

The first performance parameter may be a one way packet loss and/or the second performance parameter may be a RTT. The on-path observer entity 200 may adjust a protocol parameter of the CoAP communication 2 based on the first performance parameter and/or based on the second performance parameter.

The on-path observer entity 200 may further output a notification to the device 100 or the other device 110, the notification indicating the adjusted protocol parameter of the CoAP communication 2. A constrained node may need a simple way to do performance measurements. For example, one bit (e.g., the Q bit 301) or two bits (e.g., the Q bit 301 and the S bit 302) may be used. When using two bits, both mechanisms can be improved. With one bit all relevant measurements are still possible.

By equipping the CoAP communication two with PM bits, one or more of the following benefits may be achieved.

- Enabling measurements of RTT and loss metrics. For example, the signaling of loss and RTT events may be used to signal the network issues to the on-path observer entity 200.
- General mechanisms of CoAP may be improved. For example, this performance information may be used to adjust timeout values based on the real network performance. It may also be possible to decide whether to use a reliable or unreliable message transmission based on one or more network conditions.
- The gateway (Proxy) may be able to read a CoAP header and adjust one or more options of this header. For example, the gateway (Proxy) may inform a client and/or a server, and the client and/or the server may adjust one or more parameters accordingly.

The on-path observer entity 200 may comprise processing circuitry configured to perform, conduct or initiate the various operations of the on-path observer entity 200 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the on-path observer entity 200 to perform, conduct or initiate the operations or methods described herein.

Figure 3B:
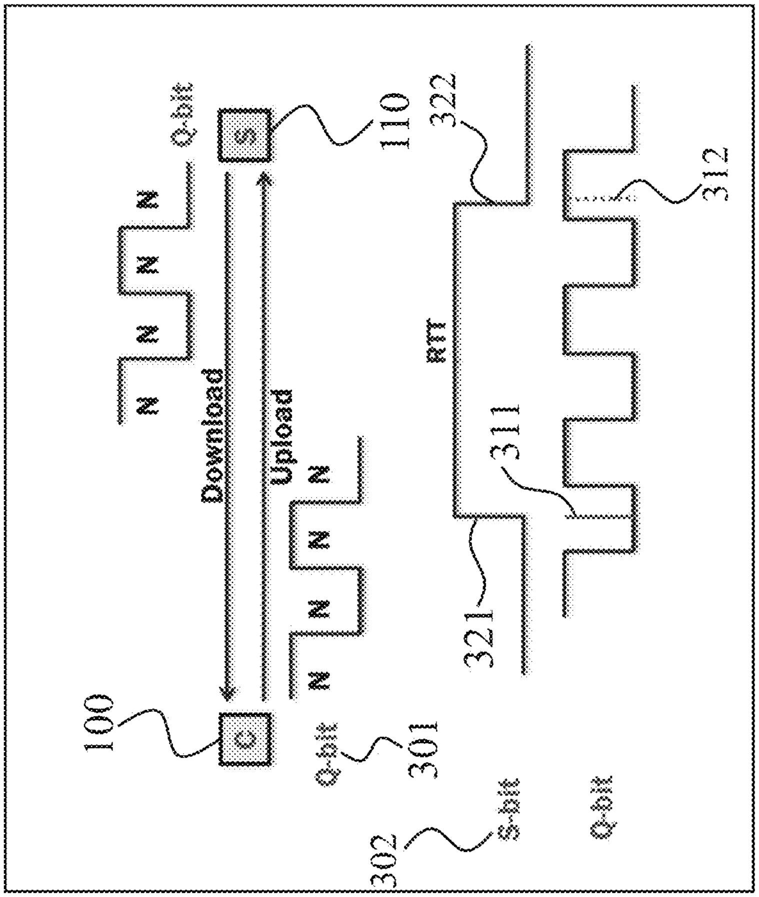
FIGS. 3A-3B depicts a schematic view of a diagram illustrating a header comprising an option value, and depicts how a synergy between Q bit and S bit can be exploited.
Figure 3A:
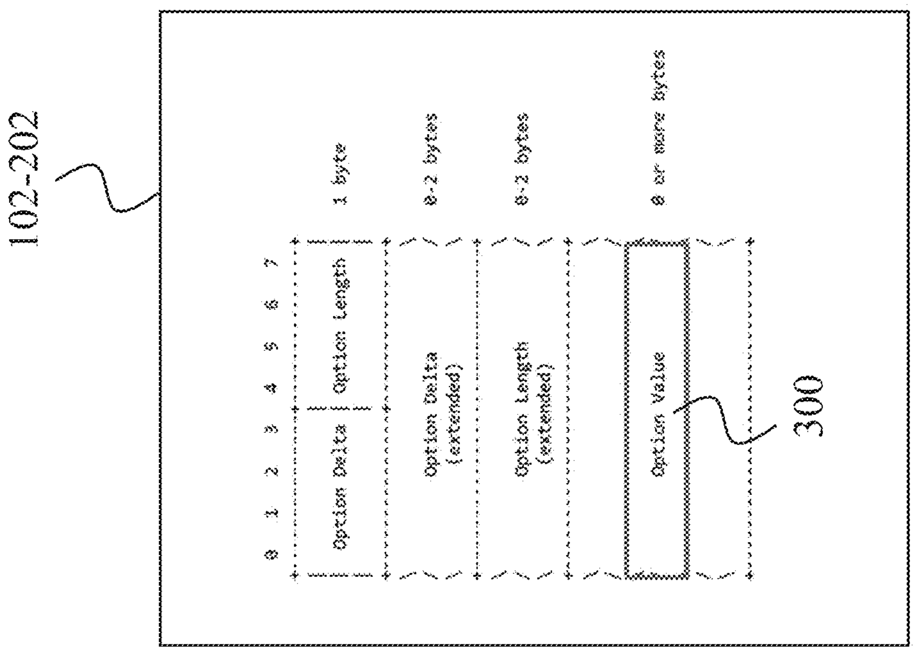

FIG. 3A depicts a schematic view of a header 102 or 202 (depending on whether it is for the message 101 of FIG. 1 or for the specific CoAP message 201 of FIG. 2), the header 102 or 202 comprising several options, and in particular an option 300 reserved for PM bits. The option 300 may include a Q bit 301 as the first PM bit, and optionally may also include an S bit 302 as a second PM bit. The device 100 or 110 may be configured to set the value of the option 300 and to include the option 300 into the header 102 of the message 101 or the header 202 of the message 201. The option 300 may hold at least one bit, but may also hold more than one bit or even one or more bytes.

FIG. 3B illustrates how a synergy between the Q bit 301 and an S bit 302 can be exploited by the device 100 or the other device 110, in this exemplary case. The Q bit 301 creates square waves of a known length to measure packet loss. The length of the square waves is fixed by a predefined number of packets, wherein in this way each endpoint can detect a packet loss, if it receives less packets than it expected. In addition, one packet in a period of the square wave can be selected and can be set to the opposite value of that period. After one RTT, the selected packet comes back, and another packet may be selected and may be set again to the opposite value of that period. Further, the process can start all over. By measuring the distance between these special packets (selected and set as described above), it is possible to measure the RTT, as well. So, with one bit, it maybe possible to measure both the loss and the RTT delay. This synergy can be employed to use just one bit for both losses and RTT metrics, or to reinforce the S Bit 302 mechanism in order to verify the accuracy of the RTT measurements. Indeed, it is possible to synchronize the two RTT measurements, and to compare or average the results.

For example, the device 100 may determine a signal to obtain a RTT and a one way packet loss for the message 101 or for the message 201, based on only the first PM bit. That is, in this case the option 300 may include only the first PM bit. For example, the first PM bit may be a Q bit 301, which may be modified to emulate an S bit. The Q bit 301 may be used for creating a square wave of a known length (e.g., 64 packets). The device 100 (or the other device 110) may set the Q bit 301, and may toggle its value (0 or 1) every fixed number of packets. The number of packets can be recognized, and the packet loss can thus be determined (if packet loss occurs). However, also the RTT may be determined based on the Q bit 301 in this case, for example, based on a time interval between determined signal characteristics of the square wave signal of the Q bit 301, wherein these signal characteristics emulate the S bit 302. In this way, the first PM bit is used to exploit a synergy between the Q bit 301 and S bit 302 (similarities of the wave signals generated).

To this end, the header 102 or the header 202 may comprise only the Q bit 301 as mentioned. The Q bit 301 may be used for creating the square waves as shown in FIG. 3B. Assuming that the length of the square waves can be fixed e.g., it has a predefined number of packets as mentioned above, the device 100 may select a first packet 311 from the predefined number of packets of the square wave, in order to measure the RTT. The device 100 determines the value of the Q bit 301 at the first packet 311. The device 100 may further select a second packet 312 in the square wave, and toggle the value of the Q bit at the second packet 312 to the opposite value of the Q bit at the first packet 311. As it can be derived from FIG. 3B, the value of the Q bit in the second packet 312 is toggled to the opposite value of the Q bit in the first packet 311. This emulates the S bit 302.

After one RTT, the second packet may come back and may be detected. Hence, by detecting again the second packet 312, the device 100 is able to determine a second time 322 for the RTT. This process may be iteratively performed, wherein during each iteration a new second packet is selected and further detected.

Hence, by measuring the distance between the first packet 311 and the second packet 312, it is possible to measure the RTT. Consequently, the device 100 can measure the RTT, e.g., only based on one PM bit (i.e., only the Q bit 301 emulating the S bit).

Therefore, with one PM bit (e.g., only the Q bit 301), it may be possible to measure loss information, delay information, and also emulate the S bit. The S bit 302 can thus be omitted. For example, the device 100 may set the value of the Q bit to 1, at the first time 321 (emulating an S bit being set to 1). The device 100 may set the value of the Q bit to 0, at the second time 322 (emulating an S bit being set to 0).

An additional S bit 302 may also be used for determining the RTT. Thus, in a further example, the device 100 may also change the value of an S bit as the second PM bit from 0 to 1 or from 1 to 0, once per each end-to-end RTT. That is, in this case the option 300 may include the Q bit and the S bit. For instance, the S bit 302 may cause one bit to 'spin', generating one edge (a transition from 0 to 1 or from 1 to 0) once per end-to-end RTT. The spin bit may be set by both sides (e.g., the device 100 being a client device or the other device 110 being a server device) to the same value, for as long as one round trip lasts and then it toggles the value.

Furthermore, the device 100 may determine the one way delay for the one or more event bits, and/or determine the one way packet loss for the message 101 based on one or more event bits.

Figure 4B:
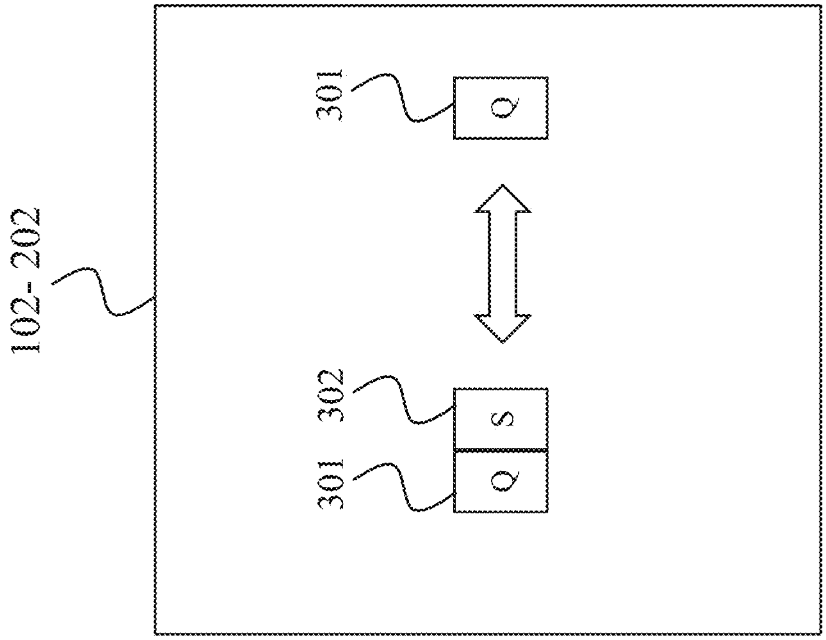
FIGS. 4A-B show diagrams illustrating an option value indicating Q bit, S bit, delay information and loss information.
Figure 4A:
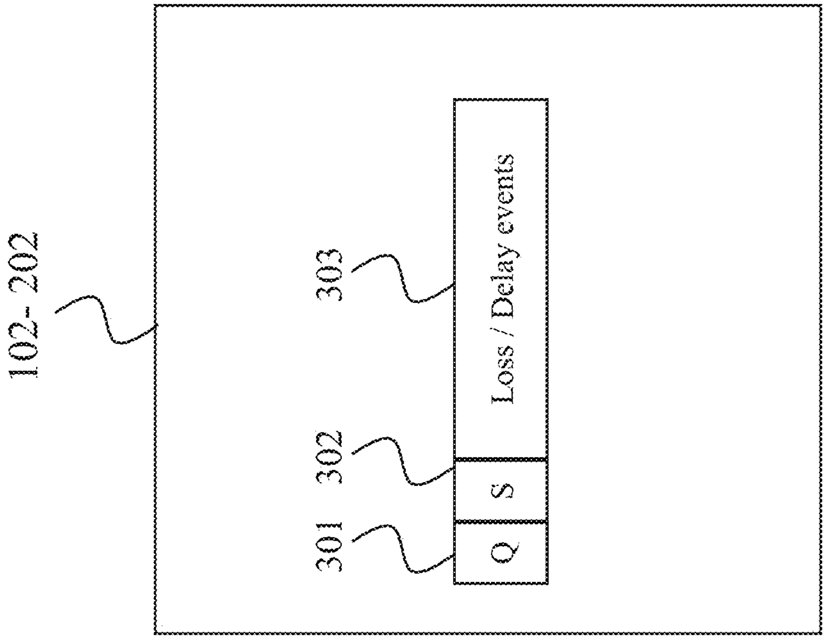

FIG. 4A and FIG. 4B show diagrams illustrating an option value indicating Q bit 301, S bit 302, delay and loss information 303.

The option of the header 102 or 202 may be limited to only two PM bits (e.g., the Q bit 301 and the S bit 302). The option of the header 102 or 202 may indicate the event bits that may be used by the on-path observer 200.

In FIG. 4A, the option includes a first PM bit which is the Q bit 301, the second PM bit which is the S bit 302, the event bit which is the loss and delay event 303. Further, it may be possible that the option includes one of the event bits, for example, only the delay event or only the loss event.

In FIG. 4B, the option includes only a first PM bit which is the Q bit 301. The Q bit 301 may be used for obtaining delay information, loss information and setting the value of the S bit, as it is described above.

By providing the PM bits and/or the event bits in the header 102 or 202, the on-path observer 200 may read the event signaling bits and may interconnect disjointed CoAP networks. This may enable the on-path observer 200 to communicate with client and server to set some parameters such as timeout based on the network performance. A simplified method may be provided for determining the performance metrics. A well-defined sQuare wave may be used and there may be no need to read sequence numbers, and may further there may be no need to store timestamps.

Figure 5:
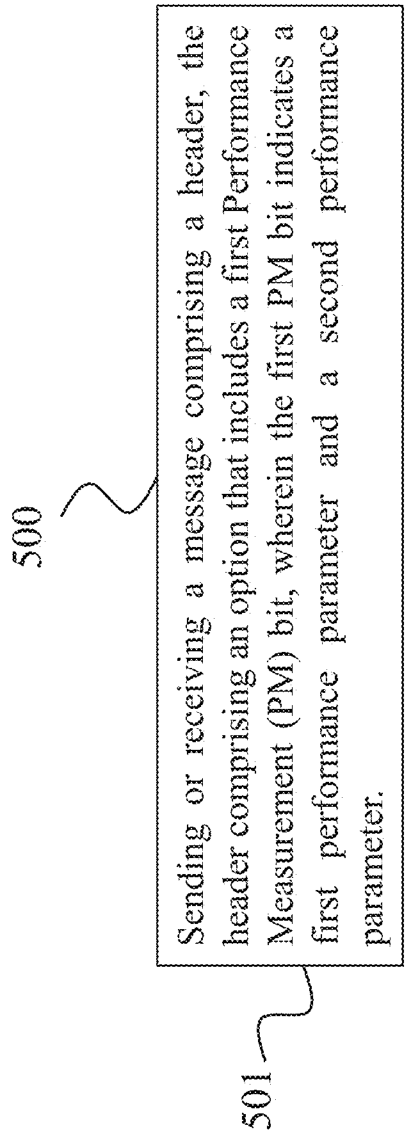
FIG. 5 depicts a flowchart of a method for operating according to a client-server communication protocol in a communication network, according to an exemplary embodiment of the disclosure.

FIG. 5 shows a method 500 according to an embodiment of the disclosure for operating according to a client-server communication protocol in a communication network 1. The method 500 may be carried out by the device 100, as it described above.

The method 500 comprises a step 501 of sending or receiving a message 101 comprising a header 102, the header 102 comprising an option that includes a first PM bit, wherein the first PM bit indicates a first performance parameter and a second performance parameter.

Figure 6:
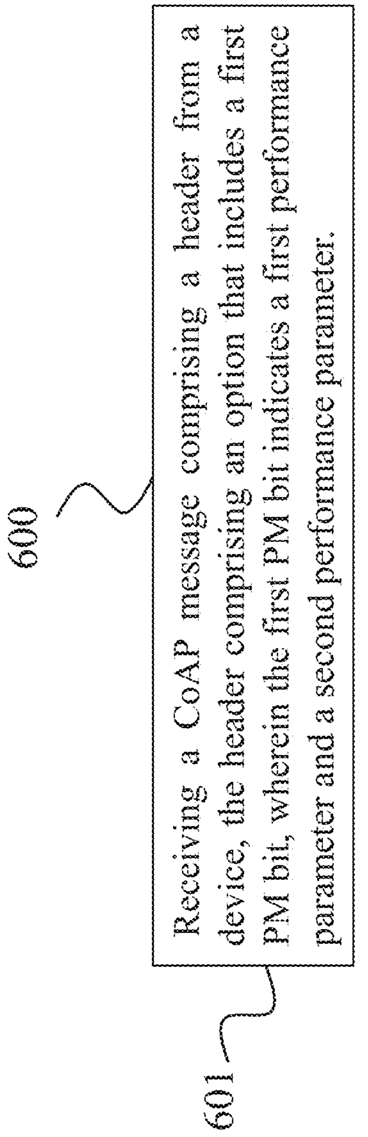
FIG. 6 depicts a flowchart of a method for an on-path observer entity for a CoAP communication, according to an exemplary embodiment of the disclosure.

FIG. 6 shows a method 600 according to an embodiment of the disclosure for an on-path observer entity 200 for a CoAP communication 2. The method 600 may be carried out by the on-path observer entity 200, as it described above.

The method 600 comprises a step 601 of receiving a CoAP message 201 comprising a header 202 from a device 100, 110, the header 201 comprising an option that includes a first bit, wherein the first PM bit indicates a first performance parameter and a second performance parameter.

The present disclosure has been described in conjunction with various embodiments as examples as well as implementations. However, a person skilled in the art can make various modifications and variations to this application without departing from the scope of this application. This application is intended to cover these modifications and variations of this application provided that they fall within the scope of the claims of this application and their equivalent technologies. In the claims, as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for operating according to a client-server communication protocol in a communication network, the device comprising:

a processor; and a memory having instructions stored thereon;

wherein, based on the processor executing the instructions, the device is configured to:

send to or receive from another device in the communication network, a message comprising a header, the header comprising an option value that comprises a first performance measurement (PM) bit, wherein the first PM bit indicates a first performance parameter and a second performance parameter, wherein the first performance parameter is a one way packet loss;

set a value of the first PM bit for the message based on a predefined criterion; and determine the one way packet loss for the message based on the value of the first PM bit.

2. The device according to claim 1, wherein the first PM bit is a sQuare (Q) bit.

3. The device according to claim 1, wherein the second performance parameter is a round-trip time (RTT); and wherein, based on the processor executing the instructions, the device is further configured to flip a value of a first PM bit of a respective packet to an opposite of the value, once per each RTT.

4. The device according to claim 3, wherein, based on the processor executing the instructions, the device is further configured to:

determine a signal to retrieve an estimated RTT for the message based on the first PM bit of the message.

5. The device according to claim 1, wherein the option value further comprises at least one of:

a second PM bit; or one or more event bits.

6. The device according to claim 5, wherein the option value further comprises the second PM bit, and the second PM bit is a Spin(S) bit.

7. The device according to claim 6, wherein the option value further comprises the one or more event bits, and the one or more event bits are configured to encode at least one of loss information or delay information.

8. The device according to claim 7, wherein, based on the processor executing the instructions, the device is further configured to determine a one way delay for the one or more event bits; and/or wherein determining the one way packet loss for the message is further based on the one or more event bits.

9. The device according to claim 8, wherein, based on the processor executing the instructions, the device is further configured to:

provide a constrained application protocol (CoAP) message to an on-path observer entity of CoAP communication.

10. The device according to claim 5, wherein the option value further comprises the second PM bit, and wherein the second PM bit has a value of 0 or 1; and wherein, based on the processor executing the instructions, the device is further configured to change the value of the second PM bit from 0 to 1 or from 1 to 0, once per each end-to-end RTT.

11. The device according to claim 8, wherein, based on the processor executing the instructions, the device is further configured to:

receive a notification from an on-path observer entity; and adjust a protocol parameter of a constrained application protocol (CoAP) communication based on the first performance parameter and/or based on the second performance parameter.

12. The device according to claim 1, wherein:

the communication network is based on a machine-to-machine (M2M) network performing a constrained application protocol (CoAP) communication as the client-server communication protocol;

the device is a server or a client and is configured to perform the CoAP communication; and/or the message is a CoAP message.

13. The device according to claim 1, wherein the predefined criterion corresponds to a fixed number of data packets of the message.

14. An on-path observer entity for a constrained application protocol (CoAP) communication, the on-path observer entity comprising:

a processor; and a memory having instructions stored thereon;

wherein, based on the processor executing the instructions, the on-path observer entity is configured to:

receive a CoAP message comprising a header from a device, the header comprising an option value that comprises a first performance measurement (PM) bit, wherein the first PM bit indicates a first performance parameter and a second performance parameter, wherein the first performance parameter is a one way packet loss and/or the second performance parameter is a round-trip time (RTT);

adjust a protocol parameter of the CoAP communication based on the first performance parameter and/or based on the second performance parameter; and output a notification to the device, the notification indicating the adjusted protocol parameter of the CoAP communication.

15. The on-path observer entity according to claim 14, wherein the on-path observer entity is or is included in a proxy or a gateway for the CoAP communication.

16. A method for operating according to a client-server communication protocol in a communication network, the method comprising:

sending or receiving, by a device, a message comprising a header, the header comprising an option value that comprises a first performance measurement (PM) bit, wherein the first PM bit indicates a first performance parameter and a second performance parameter, wherein the first performance parameter is a one way packet loss;

setting, by the device, a value of the first PM bit for the message based on a predefined criterion; and determining, by the device, the one way packet loss for the message based on the value of the first PM bit.

17. The method according to claim 16, wherein the first PM bit is a sQuare (Q) bit.

18. The method according to claim 16, wherein the second performance parameter is a round-trip time (RTT); and wherein the method further comprises: flipping, by the device, a value of a first PM bit of a respective packet to an opposite of the value, once per each RTT.

19. The method according to claim 16, wherein the option value further comprises at least one of:

a second PM bit; or one or more event bits.

20. The method according to claim 19, wherein the option value further comprises the second PM bit, and the second PM bit is a Spin (S) bit.

* * * * *